(12) United States Patent
Bannister et al.

(10) Patent No.: US 10,021,465 B2
(45) Date of Patent: Jul. 10, 2018

(54) SYNCHRONIZING MEDIA DEVICES (71) Applicant: TIMECODE SYSTEMS LIMITED, Worcester (GB)

(72) Inventors: Paul Leslie Bannister, Worcester (GB); Paul Scurrell, Worcester (GB)

(73) Assignee: Timecode Systems Limited, Worcester (GB)

( * ) Notice: Subject to any disclaimer, the term of this patent is extended or adjusted under 35 U.S.C. 154(b) by 0 days.

(21) Appl. No.: 15/290,125

(22) Filed: Oct. 11, 2016

(65) Prior Publication Data
US 2017/0105054 A1    Apr. 13, 2017

Related U.S. Application Data

(60) Provisional application No. 62/240,352, filed on Oct. 12, 2015, provisional application No. 62/307,820, (Continued)

(51) Int. Cl.
| | |
|---|---|
| H04N 7/18 | (2006.01) |
| H04N 21/8547 | (2011.01) |
| H04N 21/262 | (2011.01) |
| H04N 21/43 | (2011.01) |
| H04N 21/435 | (2011.01) |

(Continued)

(52) U.S. Cl.
CPC ......... *H04N 21/8547* (2013.01); *G11B 27/10* (2013.01); *G11B 27/3036* (2013.01); *H04J 3/0661* (2013.01); *H04N 5/0733* (2013.01); *H04N 5/765* (2013.01); *H04N 9/8205* (2013.01); *H04N 21/242* (2013.01); *H04N 21/262* (2013.01); *H04N 21/27* (2013.01); *H04N 21/4305* (2013.01); *H04N 21/435* (2013.01); *H04N 21/44209* (2013.01); *H04N 21/458* (2013.01)

(58) Field of Classification Search
CPC .. H04N 21/21805; H04N 5/247; H04N 5/262; H04N 21/2743; H04N 5/04; H04N 5/0733; H04N 5/225; H04N 21/4305
See application file for complete search history.

(56) References Cited

U.S. PATENT DOCUMENTS

| | | |
|---|---|---|
| 5,557,423 A | 9/1996 | Phillips et al. |
| 5,892,552 A | 4/1999 | Kim |

(Continued)

FOREIGN PATENT DOCUMENTS

| | | |
|---|---|---|
| EP | 2 161 921 A1 | 3/2010 |
| JP | 2007-081686 A | 3/2007 |
| WO | 02/01775 A1 | 1/2002 |

OTHER PUBLICATIONS

Notice of Allowance dated Nov. 24, 2017 in U.S. Appl. No. 15/005,599 (10 pages).
(Continued)

*Primary Examiner* — Jason Salce
(74) *Attorney, Agent, or Firm* — Brown Rudnick LLP (57) ABSTRACT

Synchronizing media devices can include generating a synchronization schedule based on a frequency of generation of one or more timecode packets. Each timecode packet of the one or more time packets includes a timecode. A timecode can be expressed in hours, minutes, seconds, and frames. One or more media devices are synchronized using the synchronization schedule.

17 Claims, 9 Drawing Sheets

Related U.S. Application Data filed on Mar. 14, 2016, provisional application No. 62/323,139, filed on Apr. 15, 2016.

(51) Int. Cl.

| | | |
|---|---|---|
| *H04N 21/442* | (2011.01) | |
| *H04N 21/458* | (2011.01) | |
| *H04J 3/06* | (2006.01) | |
| *G11B 27/10* | (2006.01) | |
| *G11B 27/30* | (2006.01) | |
| *H04N 5/073* | (2006.01) | |
| *H04N 5/765* | (2006.01) | |
| *H04N 9/82* | (2006.01) | |
| *H04N 21/242* | (2011.01) | |
| *H04N 21/27* | (2011.01) | |

(56) References Cited

U.S. PATENT DOCUMENTS

| | | | |
|---|---|---|---|
| 6,831,729 B1 | 12/2004 | Davies | |
| 7,024,155 B2 | 4/2006 | Gosieski, Jr. | |
| 7,200,320 B1 | 4/2007 | Denecke et al. | |
| 7,321,601 B2 | 1/2008 | Rogerson et al. | |
| 7,324,743 B2 | 1/2008 | Hosoda | |
| 7,398,411 B2 | 7/2008 | Zweigle et al. | |
| 7,436,899 B2 | 10/2008 | Rogerson et al. | |
| 7,552,193 B2 | 6/2009 | Carro | |
| 7,555,196 B1 | 6/2009 | Crawford et al. | |
| 7,593,619 B2 | 9/2009 | Yamasaki | |
| 7,609,608 B2 | 10/2009 | Rogerson et al. | |
| 7,633,551 B2 | 12/2009 | Sullivan | |
| 7,673,316 B2 | 3/2010 | Incentis Carro | |
| 7,711,443 B1 | 5/2010 | Sanders et al. | |
| 7,743,161 B2 | 6/2010 | Dey et al. | |
| 7,881,587 B2 | 2/2011 | Shinkai et al. | |
| 7,913,157 B1 | 3/2011 | Stoakley et al. | |
| 7,929,902 B1 | 4/2011 | Sanders et al. | |
| 7,933,203 B2 | 4/2011 | Hahm | |
| 8,019,194 B2 | 9/2011 | Morrison et al. | |
| 8,643,779 B2 | 2/2014 | Suess et al. | |
| 8,806,544 B1 | 8/2014 | Elliott et al. | |
| 9,041,813 B1* | 5/2015 | Yakay | H04N 5/247 |
| | | | 348/153 |
| 9,049,349 B2 | 6/2015 | Ganesan et al. | |
| 2001/0044826 A1 | 11/2001 | Ludwig et al. | |
| 2002/0034255 A1 | 3/2002 | Zetts | |
| 2002/0091495 A1 | 7/2002 | Woodroffe | |
| 2003/0193577 A1* | 10/2003 | Doring | G08B 13/19634 |
| | | | 348/211.99 |
| 2005/0240531 A1 | 10/2005 | Wolff | |
| 2006/0035663 A1 | 2/2006 | Cheng | |
| 2006/0053455 A1 | 3/2006 | Mani et al. | |
| 2007/0216691 A1* | 9/2007 | Dobrin | H04N 5/073 |
| | | | 345/473 |
| 2007/0250901 A1 | 10/2007 | McIntire et al. | |
| 2010/0122168 A1 | 5/2010 | Silberstein et al. | |
| 2010/0158473 A1 | 6/2010 | Wayne et al. | |
| 2010/0195978 A1* | 8/2010 | Ekchian | H04N 5/91 |
| | | | 386/207 |
| 2011/0052137 A1* | 3/2011 | Cowie | H04N 5/232 |
| | | | 386/207 |
| 2011/0149093 A1 | 6/2011 | Kang et al. | |
| 2011/0179196 A1 | 7/2011 | Friedman | |
| 2011/0249128 A1* | 10/2011 | Squyres | G11B 27/10 |
| | | | 348/207.11 |
| 2011/0296474 A1 | 12/2011 | Babic | |
| 2012/0050591 A1 | 3/2012 | Horikawa | |
| 2012/0069943 A1 | 3/2012 | Lim et al. | |
| 2012/0236201 A1 | 9/2012 | Larsen et al. | |
| 2013/0114481 A1 | 5/2013 | Kim et al. | |
| 2013/0301635 A1* | 11/2013 | Hollabaugh | H04W 56/0035 |
| | | | 370/350 |
| 2013/0307971 A1 | 11/2013 | Ganesan et al. | |
| 2013/0330055 A1 | 12/2013 | Zimmermann et al. | |
| 2014/0085136 A1* | 3/2014 | Alpert | H04W 56/005 |
| | | | 342/357.25 |
| 2014/0307805 A1 | 10/2014 | Ihara | |
| 2014/0355947 A1 | 12/2014 | Slamecka et al. | |
| 2015/0029396 A1* | 1/2015 | Scurrell | H04N 5/0733 |
| | | | 348/515 |
| 2015/0043697 A1 | 2/2015 | Achanta et al. | |
| 2015/0098690 A1 | 4/2015 | Abbate et al. | |
| 2016/0218820 A1* | 7/2016 | Scurrell | H04J 3/0661 |
| 2017/0053674 A1* | 2/2017 | Fisher | H04N 21/84 |
| 2017/0104821 A1* | 4/2017 | Scurrell | H04L 67/1095 |
| 2017/0104896 A1* | 4/2017 | Scurrell | H04N 21/4305 |
| 2017/0105054 A1* | 4/2017 | Bannister | H04N 21/262 |

OTHER PUBLICATIONS

Non-Final Office Action dated Aug. 24, 2017 in U.S. Appl. No. 15/005,599.

Response to Office Action dated Aug. 24, 2017, dated Aug. 31, 2017 in U.S. Appl. No. 15/005,599.

Non-Final Office Action dated Jul. 24, 2017 in U.S. Appl. No. 15/290,709.

Response to OA dated Jul. 24, 2017, dated Jul. 25, 2017 in U.S. Appl. No. 15/290,709.

Non-Final Office Action dated Aug. 3, 2017 in U.S. Appl. No. 15/290,709.

Response to OA dated Aug. 3, 2017, dated Aug. 21, 2017 in U.S. Appl. No. 15/290,709.

Supplemental Response to OA, dated Aug. 22, 2017 in U.S. Appl. No. 15/290,709.

Non-Final Office Action dated Oct. 5, 2015 in U.S. Appl. No. 13/948,252.

Response to OA dated Oct. 5, 2015, dated Jan. 4, 2016 in U.S. Appl. No. 13/948,252.

Final Office Action dated May 2, 2016 in U.S. Appl. No. 13/948,252.

Response to OA dated May 2, 2016, dated Aug. 1, 2016 U.S. Appl. No. 13/948,252.

Non-Final Office Action dated Sep. 23, 2016 in U.S. Appl. No. 13/948,252.

Response to OA of Sep. 23, 2016, dated Mar. 17, 2017 in U.S. Appl. No. 13/948,252.

Final Office Action dated Jun. 2, 2017 in U.S. Appl. No. 13/948,252.

Response to OA dated Jun. 2, 2017, dated Jun. 20, 2017 in U.S. Appl. No. 13/948,252.

Non-Final Office Action dated Aug. 17, 2017 in U.S. Appl. No. 13/948,252.

Response to OA dated Aug. 17, 2017, dated Aug. 25, 2017 in U.S. Appl. No. 13/948,252.

F. Beacham, "Precision Time Code and Genlock Bring Wireless Action Cameras Into Live Broadcasting—The Broadcast Bridge Connecting IT to Broadcast," Jun. 23, 2015. Retrieved from the Internet: URL:https://www.thebroadcastbridge.com/content/entry/2879/precision-time-code-and-genlock-bring-wireless-action-cameras-into-live-bro.

"An ultra compact timecode, genlock and word clock generator with transceiver," Timecode Systems minitrx+ quick start guide. Retrieved from the Internet: URL:http://www.timecodesystems.com/wp-content/uploads/2015/09/Timecode-Buddy-TRX-Plus-Quickstart-guide-web.pdf.

"Digital cellular telecommunications system (Phase 2); Radio subsystem synchronization (GSM 05.10)," European Telecommunication Standard (ETS) 300 579, vol. SMG2, Sixth Edition, Nov. 1, 1996 (Nov. 1, 1996), XP014013776.

Extended Search Report dated Feb. 7, 2017 in EP Application No. 16193386.6.

Partial Search Report dated Jan. 27, 2017 in EP Application No. 16193388.2.

Extended Search Report issued Feb. 7, 2017 in EP Application No. 16193387.4.

"Clockit Timecode ACL 204 Lockit" Rev. 3.11 manual by Ambient Recording GmbH, 32 pages, copyright 2013.

(56) References Cited

OTHER PUBLICATIONS

"Clockit Timecode ACL 204 Lockit" Rev. 1.00 manual by Ambient Recording GmbH, 24 pages, copyright 2012.
"The Trilevelsync Lockit Box ACL 203" manual by Ambient Recording GmbH, 9 pages, from about 2012 or earlier.
Notice of Allowance dated Oct. 12, 2017 in U.S. Appl. No. 15/290,709 (18 pages).
Final Office Action dated Dec. 14, 2017 in U.S. Appl. No. 13/948,252.
Non-Final Office Action dated Mar. 16, 2018 for U.S. Appl. No. 15/290,698 (11 Pages).

\* cited by examiner

SYNCHRONIZING MEDIA DEVICES

CROSS-REFERENCE TO RELATED APPLICATIONS

This application claims priority to and the benefit of U.S. Provisional Application No. 62/240,352, filed on Oct. 12, 2015, U.S. Provisional Application No. 62/307,820, filed on Mar. 14, 2016, and U.S. Provisional Application No. 62/323,139, filed on Apr. 15, 2016.

The entire teachings of the above applications are incorporated herein by reference in their entirety.

TECHNICAL FIELD

This disclosure relates to wirelessly synchronizing data between media devices.

BACKGROUND INFORMATION

Modern audio and video processing systems typically use multiple cameras for simultaneous audio and video recording of their subjects. For the multiple recordings to be effectively employed in post-production, where all of the raw recording materials are edited into a final recording, the audio and video signals from all utilized cameras must be carefully synchronized.

SUMMARY

A Society of Motion Picture and Television Engineers ("SMPTE") timecode is an industry standard timecode that is used to identify a precise location in digital systems and on time-based media (e.g., audio or video tape) and is relied on for synchronization and reference throughout the audio, video, and post-production process. Without this synchronization, the audio and video signals from one camera at a given point in time may not properly align with the audio and video signals from a second camera. The systems described herein not only provide timecode and synchronization data from a control ("Master") unit to multiple remote units (e.g., networked "Slave" units) using a wireless network, but also allow the control unit and the remote units to communicate using a 2-way data exchange.

Many of the systems described herein include a data and wireless network protocol that not only provides timecode and synchronization data from a master unit to multiple networked slave units using a wireless network, but also allows the slave units to communicate with the master unit for 2-way data exchange. Advantageously, the data is transmitted or received during the exact timecode frame period. This technique allows the system to communicate with multiple remote devices in real time without additional equipment. Essentially, the typical function of a timecode generator is expanded to a generator, transceiver and complex connectivity hub. This expansion transforms a timecode generator into a networked programmable master clock unit, by allowing the generator to still serve as a master timecode and sync generator (by generating data using an internal master clock), while also adding the capability to remotely distribute (e.g., via wired and wireless networks) timecode and synchronization data to networked devices needing timecode data and the capability to synchronize timecode data during an event. In one example, a networked programmable master clock unit provides timecode and sync data to a single or multiple network programmable SLAVE devices and synchronizes timecode, sync and control data during any pre-recorded or live event; such as filming a movie, commercial, sporting event.

Many of the systems described herein also communicate via a protocol that also allows the RF transceiver chip to switch its transmit or receive RF frequency for different timecode frame intervals, to comply with Frequency Hopping Spread Spectrum ("FHHS") techniques required for worldwide radio approvals. This helps to reduce total energy consumption while also bringing the system into compliance with communication regulations.

In one aspect, the present disclosure includes a method for synchronizing media devices. The method includes generating a synchronization schedule based on a frequency of generation of one or more timecode packets. Each timecode packet of the one or more timecode packets includes a timecode. The method further includes synchronizing one or more media devices using the synchronization schedule.

In another aspect, the present disclosure includes a system for synchronizing media devices. The system comprises a synchronization module configured to generate a synchronization schedule based on a frequency of generation of one or more timecode packets, and synchronizing one or more media devices using the synchronization schedule.

In other cases, the method and synchronization module also determine a generation time for each timecode packet of the one or more timecode packets, and determine the frequency of generation based on the generation time of a set of the one or more timecode packets.

The method and synchronization module can also determining a generation time for each timecode packet of the one or more timecode packets, and determining the frequency of generation based on the generation time of a set of the one or more timecode packets.

In some aspects, generating the synchronization schedule includes using a clock having an accuracy of at least 1 parts per million (PPM).

In a further aspect, the method and synchronization module determine at least one subject frame per second in which the one or more timecode packets are to be transmitted to at least one slave media device.

In some cases, the at least one subject frame per second corresponds to the frequency of generation of each timecode packet.

The method and synchronization module can further perform an initial synchronization with at least one slave media device, the initial synchronization achieving a clock synchronization with the at least one slave device of least 20 microseconds.

In another aspect, the method can include transmitting synchronization information. Transmitting synchronization information can include holding a transmit packet in a ready state prior to a scheduled timecode transmission time based on the synchronization schedule, the transmit packet carrying the synchronization information, and using a gate array (GA) in communication with a clock to trigger a radio frequency (RF) transmitter to transmit the transmit packet at the scheduled timecode transmission time.

In a further aspect, the system can also include a memory configured to hold a transmit packet in a ready state prior to a scheduled timecode transmission time based on the synchronization schedule, the transmit packet carrying synchronization information, and a gate array (GA), in communication with a clock, configured to trigger a radio frequency (RF) transmitter to transmit the transmit packet at the scheduled timecode transmission time.

In other cases, the method can also include generating a local timecode. The local timecode can have a time corresponding to a local clock. The method can further include receiving the one or more timecode packets from a master device, and synchronizing the local clock with a master device clock based on a comparison of the local timecode and a master device timecode, the master device timecode included in the one or more timecode packets.

Also, in an aspect, the system can include a timecode module configured to generate a local timecode, the local timecode having a time corresponding to a local clock, an RF receiver configured to receive one or more timecode packets from a master device, and the timecode module can be further configured to synchronize the local clock with a master device clock based on a comparison of the local timecode and a master device timecode, the master device timecode included in the one or more timecode packets.

In a further aspect, the method can include monitoring receive time of each timecode packet of the one or more timecode packets based on the synchronization schedule, and maintaining clock synchronization with the master device based on the receive time of the one or more timecode packets and the synchronization schedule.

The method can also include monitoring incoming radio frequency (RF) packets to for a SYNCH word to identify a subject packet of the incoming RF packets as a timecode packet; triggering an RF receiver to issue a signal pulse, the signal pulse used to measure an arrival time of the subject packet in response to detecting the SYNCH word, and tuning the local clock using at least one of: the synchronization schedule, the arrival time of the time subject packet, and a transmission time embedded in the subject packet.

In other aspects, the RF receiver of the system can be further configured to monitor incoming radio frequency (RF) packets to for a SYNCH word to identify a subject packet of the incoming RF packets as a timecode packet, and issue a signal pulse to a gate array (GA), in communication with the local clock, in response to detecting the SYNCH word. Additionally, the GA of the system can be configured to measure an arrival time of the subject packet in response to receiving the signal pulse, and tune the local clock using at least one of: the synchronization schedule, the arrival time of the time subject packet, and a transmission time embedded in the subject packet.

These and other aspects, features, and implementations, and combinations of them, may be expressed as apparatus, methods, methods of doing business, means or steps for performing functions, components, systems, program products, and in other ways.

Other aspects, features, and advantages will be apparent from the description and drawings, and from the claims.

BRIEF DESCRIPTION OF THE DRAWINGS

The foregoing will be apparent from the following more particular description of example embodiments of the present disclosure, as illustrated in the accompanying drawings in which like reference characters refer to the same parts throughout the different views. The drawings are not necessarily to scale, emphasis instead being placed upon illustrating embodiments of the present disclosure. In particular, features and advantages of the claimed subject matter will be apparent from the following description of embodiments consistent therewith, which description should be considered with reference to the accompanying drawings.

For a thorough understanding of the present disclosure, reference should be made to the following description, including the appended claims, in connection with the above-described drawings. Although the present disclosure is described in connection with exemplary embodiments, the disclosure is not intended to be limited to the specific forms set forth herein. It is understood that various omissions and substitutions of equivalents are contemplated as circumstances may suggest or render expedient.

DESCRIPTION

A description of example embodiments of the present disclosure follows.

In general, this disclosure relates to a scalable system that facilitates synchronization across media devices, for example, professional media equipment, and personal devices. This synchronization includes providing timecode, genlock, and metadata to the personal devices using wireless networks systems.

The scalable system includes devices, transceivers, controllers, and/or adapters that cooperate to ensure that each camera, sound recording device, and personal device receives accurate timecode sync data and/or Word Clock or Genlock signals. In some examples, a two-way data exchange is accomplished using the spare bandwidth associated with each timecode frame transmission. The transmitted and received data can be multiplexed from many sources to form an RF network also referred to herein as "B:LINK™." Examples of such sources including devices, modules, transceivers, controllers and/or adapters and methods are described herein.

Figure 1:
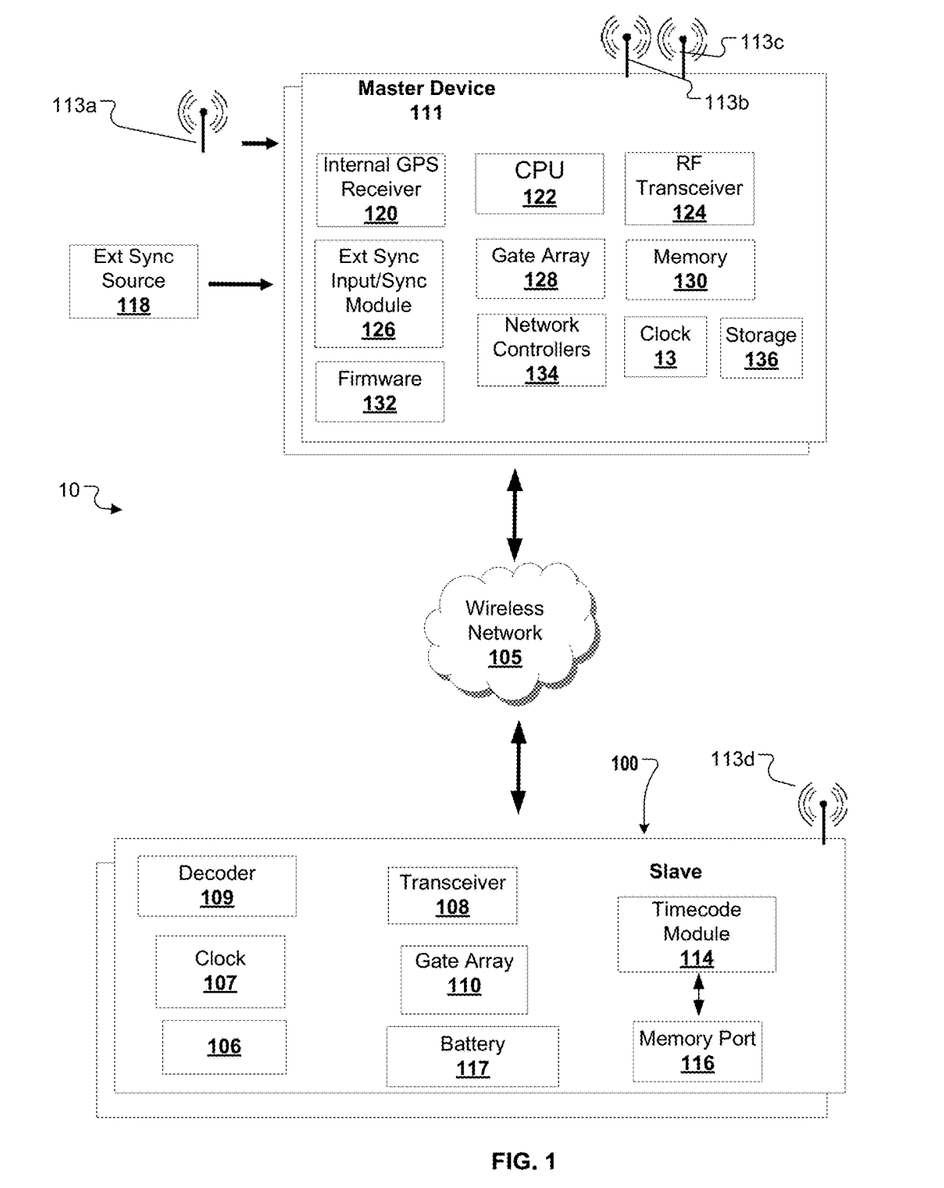
FIG. 1 is a schematic illustrating an exemplary network environment in which one embodiment of the disclosure may operate.

FIG. 1 is a schematic illustrating an exemplary network 10 environment in which a plurality of media devices operate. For instance, the system 10 includes one or more master devices 111, a wireless network 105, and one or more slave devices 100.

At least one of the master devices 111 can be a base station that is a networked programmable timecode generator. The base station is intended to be moveable between sites and stationary during use. For example, the base station can be installed in a rack-mountable format for semi or permanent installation, which is compatible with a motion picture filming location, permanent venue, or temporary venue. The master device 111 can generate timecode data through a clock 13. To ensure precise synchronization between media devices, the clock 13 should be a clock having an accuracy of at least 1 parts per million (PPM). For example, the clock 13 can be a temperature compensated crystal oscillator ("TCXO") reference oscillator, an oven-controlled crystal oscillator ("OXCO") reference oscillator, a rubidium atomic clock, GPS time, NTP, or similar technology.

The master device 111 generates data using the clock 13 (e.g., an internal master clock) or using external time information while simultaneously distributing, via wired and wireless networks, timecode, synchronization data and/or control data to networked devices needing timecode data. In some cases, the master device 111 can gather status information from media devices communicatively coupled to a closed network (e.g., the wireless network 105), and display this compiled information over a graphical user interface ("GUI") of a computing device. This status information can include SD card status, battery status, recording status or a combination thereof.

The CPU 122 serves as the primary microprocessor for the master device 111 and can have a single or multiple cores. The CPU 122 may include one or more microprocessors and/or processing devices. The CPU 122 may include any appropriate processor and/or logic that are capable of receiving and storing data, and of communicating over a network.

The memory 130 is the primary memory component for the master device 111 and can be SRAM, DRAM, or any other standard volatile or non-volatile memory. For example, the memory 130 can include a hard drive and a random access memory storage device, such as a dynamic random access memory, machine-readable media, machine-readable hardware storage devices, or other types of non-transitory machine-readable storage devices.

In some cases, the master device 111 receives external synchronization input 126 from an external sync source 118. Additionally or alternatively, the base station 111 can receive external timing information using a GPS receiver 120.

The gate array 128 and the firmware 132 function as the control program or firmware for the generation of timecode and sync data, and for the RF transceiver 124. The frequency band that RF transceiver 124 of the base station 111 uses for data communication is a sub-GHz long range robust data format. For example, the master device 111 can communicate with the system devices using the ISM-sub-GHz band (865 MHz to 928 MHz). The sub-GHz long range robust data format (e.g., a BLINK protocol) can be the protocol described in U.S. Application Ser. No. 62/240,352, filed on Oct. 12, 2015, which is incorporated by reference in its entirety. The master device 111 can transfer timing data and configuration data within data packets using a wireless protocol (e.g., the BLINK protocol) over the wireless network 105. In between the timing data packets, the master device 111 can receive or send configuration or status information from other devices (e.g., cameras, sound devices, and lens devices) over the wireless network 105.

The master device 111 is configured to provide timecode, genlock, metadata or a combination thereof to media devices (e.g., slave devices 100) over a wireless network 105 (e.g., using Bluetooth or Wi-Fi connection or over a private radio frequency (RF) network (e.g., a BLINK network)) via the wireless network systems using via one or more antennas 113a-113n. For clarity, the antennas 113a-n will be referred to generally as an antenna 113.

Each of the slave devices 111 (i.e., media devices) can include personal devices, professional cameras, and personal cameras. Each of the media devices can be used by a respective user. The personal devices can be a computer, a mobile phone (e.g., a smart phone), a handheld tablet device (e.g., an IPad), or any other mobile network device capable of capturing media and running an application (e.g., a software application 104).

As shown in FIG. 1, each of the slave devices 100 includes a transceiver 108, which enables it to communicate over Wi-Fi, Bluetooth, or other wireless networks. The slave device 100 can receive data electrical signals and waveforms packets that allow reconstruction of timecode, genlock and configuration data that is transmitted by the master device 111 through any one of the antennas 113.

Each of the slave devices 100 also includes or is electrically connected to a synchronization module (e.g., a timecode module 114), which enables communication over the wireless network 105.

The timecode module 114 can include different firmware versions programmed onto the gate array 110. In some cases, the physical form of the timecode module 114 is also adapted to a particular slave device. For example, the various firmware versions are configured to enable the timecode module 114 to communicate with the particular slave device and the firmware versions account for hardware (e.g., the connector type) and communication protocols of the particular slave device. As discussed herein, the timecode module 114 is communicatively coupled to gate array 110.

In some embodiments, either or both of the gate array 110 and the gate array 128 is a field programmable gate array (FPGA). In other embodiments, either or both of the gate array 110 and the gate array 128, however, is part of a camera sensor on a chip (SOC), and, therefore, cannot be reconfigured after manufacture. Instead, in some cases, the logic gates of the gate array are manufactured directly onto the SOC. Additionally, either or both of the gate array 110 and the gate array 128 can be an application-specific integrated circuit (ASIC).

By way of overview, the timecode module 114 receives accurate timecode and sync information. For example, the timecode module 114 syncs from an external RF source (e.g., a base station) of timecode information. The timecode module 114 enables the slave device 100 to participate in 2-way-communications with the master device 111, and the timecode module 114 embeds the timecode and/or sync information into the recorded media of the slave device 100 and, in some cases, to offer remote control of the slave device 100.

The synchronization modules (e.g., the timecode module 114 and the sync module 126, and any combination thereof) can be used to either transmit accurate synchronization and configuration data to other devices when operating in a control mode (e.g., a "master" mode), or to receive highly accurate synchronization or configuration data from another device when operating in a dependent mode (e.g., in "slave" mode). In operation, for example, the master device 111 provides timecode and sync data to the timecode module of slave device(s) 100. All or part of the processes can be implemented as, special purpose logic circuitry, e.g., an FPGA and/or an application-specific integrated circuit (ASIC).

As illustrated in FIG. 1, the slave device 100 also includes a decoder module 109. The decoder module 109 can include an API protocol or similar mechanism that is configured to process a timecode package generated by a synchronization module (e.g., the timecode module 114 to obtain timecode data. In some examples, the decoder 109 is also configured to process synchronization data (e.g., genlock data).

The timecode module 114 is communicatively coupled to RF transceiver (e.g., the RF transceiver 108), and a gate array 110. The gate array 110 is used to encode, decode the RF sync data packets, and also derive the necessary signal waveforms for cameras and sound synchronization input circuitry.

In some examples, initial sync lock accuracy between the master device 111 and the slave device 100 via timecode module 114 about 20 microseconds and subsequently improves to a lock accuracy of 1 to 5 microseconds after approximately 1 minute.

The RF transceiver 108 enables the slave device 100 to communicate with the master device 111 over the wireless network 105. The frequency band that the RF transceiver 108 uses for data communication is a sub-GHz long range robust data format. For example, the slave device 100 can communicate with the master device 111 using the ISM-sub-GHz band (865 MHz to 928 MHz). The sub-GHz long range robust data format (also referred to as a BLINK protocol) can be the protocol described in U.S. Application Ser. No. 62/240,352, filed on Oct. 12, 2015, which is incorporated by reference in its entirety.

The timecode module 114 decodes the timecode and sync data via the RF transceiver 108 and the gate array 110. By decoding the timecode and sync data via the transceiver 108 and the gate array 110, the timecode module 114 can be more accurate than software alone. For example; if a Wi-Fi Timecode Signal is sent to a software application (not shown) on a personal device (e.g., an iPhone, iPad, smartphone, or tablet), there can be an accuracy of around 30 milliseconds drift between all slave device(s) 'listening' and the master device 111. In contrast, if a timecode synchronization module (e.g., the timecode module 114) is available to decode the RF data packets of the wireless network 105, there is an improved accuracy of 1 to 5 microseconds drift between 'listening' units and the master.

In some examples, each of the slave devices 100 can be an adapter configured to connect to a personal device via a connector 106 (e.g., a micro-USB or lightning connector). In such an embodiment, each of the slave devices 100 includes the timecode module 114, a memory card port 116, and a battery 117. The memory card port 116 is a physical port allowing the slave device(s) 100 to use external flash memory cards including SD, mini-SD, micro-SD, or any other similar format. The memory card port 116 is configured to receive media embedded with timecode information from the timecode module 114 for storage. In some cases, the embedded data can additionally or alternatively be streamed over a network via 3G/4G/Wi-Fi as H.265, H.264 for example.

For example, an iPhone can be electrically connected to one of the slave devices 100 using a lightning compatible connection. Additionally, the adapter can include another connection mechanism to temporarily retain the personal device within a housing (not shown). The battery 117 is the primary source of power for the slave devices 100. In some cases, the battery 117 can charge the personal device via the connector 106.

The timecode module 114 is communicatively coupled to a local internal clock 107. If the RF signal from the base station 111 is corrupt or out of range, then the timecode module 114 relies the internal local clock 107. When the timecode module 114 receives reliable data packets from the master device 111, the slave devices 100 can soft-sync back to lock with one of the master devices 111 (e.g., the base station). For example, the accurate internal generator (e.g., internal clock 117) coupled to the timecode module 114 is constantly soft-synced from the received and decoded RF data packets when the timecode module 114 is operating in slave mode. This helps to keep the internal clock 107 in phase or synchronized with other system devices to reduce possible drift when the slave devices 100 lose contact with the master devices 111.

As stated herein, post production processing of captured media can get quite complex when multiple media devices are used to capture sound/audio. Accordingly, it is beneficial to have each media device synchronized.

Figure 2:
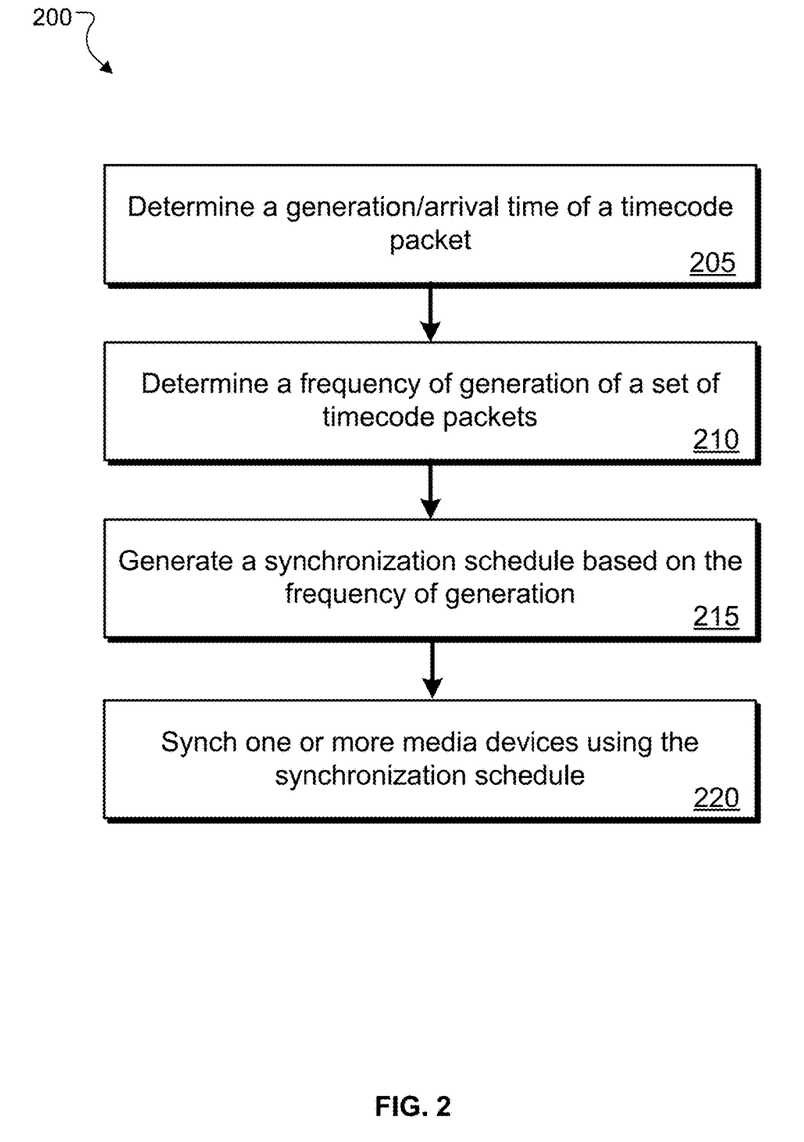
FIG. 2 is a flow chart diagramming an example process for generating a synchronization schedule for a wireless network of media devices.

FIG. 2 is a flow chart diagramming a method 200 for generating a synchronization schedule for a wireless network of media devices. At 205, the method 200 includes determining a generation time for each timecode packet of one or more timecode packets. For example, a base station (e.g., the master devices 111 of FIG. 1) can receive timecode packets from an external timecode generator (e.g., ext sync source 118 of FIG. 1). Alternatively, the base station may generate the timecode packets via a timecode generator. The timecode packet includes time information in a format consistent with SMPTE standards. For example, the time information can be expressed in HOURS, MINUTES, SECONDS, and FRAMES. A frame is a unit of measurement based on a speed at which a media device can capture media. For instance, cameras can operate at 30 frames per second. This metric indicates that the camera can capture 30 images of a scene in a single second.

The method 200, at 210, further includes determining a frequency of generation of the timecode packets. For example, the synchronization module (e.g., the sync module 126 of FIG. 1) can process a set of timecode packets to determine a rate at which the timecode packets are generated or arrive from an external timecode generator. The method 200, at 215, then generates a synchronization schedule based on the frequency of generation. Generating the synchronization schedule can include determining at least one subject frame per second in which the timecode packets are to be transmitted. The frame at which the timecode packets are to be transmitted can be contemporaneous to the time (e.g., a subject frame within a second) at which the timecode packet is generated. In order to determine precise timing information, the devices (e.g., one or more master devices 111 and one or more slave devices 100) communicatively coupled via a wireless network (e.g., the network 105) utilize respective clocks having an accuracy of 1 parts per million.

For example, the base station synchronizes media devices (e.g., slave devices 100) in order to facilitate post production processing. In particular, the media devices are communicatively coupled to the base station via a wireless network (e.g., wireless network 105 of FIG. 1). Accordingly, the synchronization schedule can allow each media device to anticipate when to listen for a synchronization signal (e.g., a timecode packet). The media devices can then compare an actual receipt time with an expected receipt time and an internally generated timecode packet to tune its internal clock (e.g., clock 107) with the base station's clock (e.g., clock 13 of FIG. 1). Thus, at 220, the method 200 includes synchronizing one or more media devices using the synchronization schedule.

It should be understood that at a first instant a media device received a synchronization schedule along with a timecode packet from a base station, the base station and the media device can have a significant difference in clock timing. Accordingly, the base station and a respective media device must go through an initial synchronization period.

Figure 3:
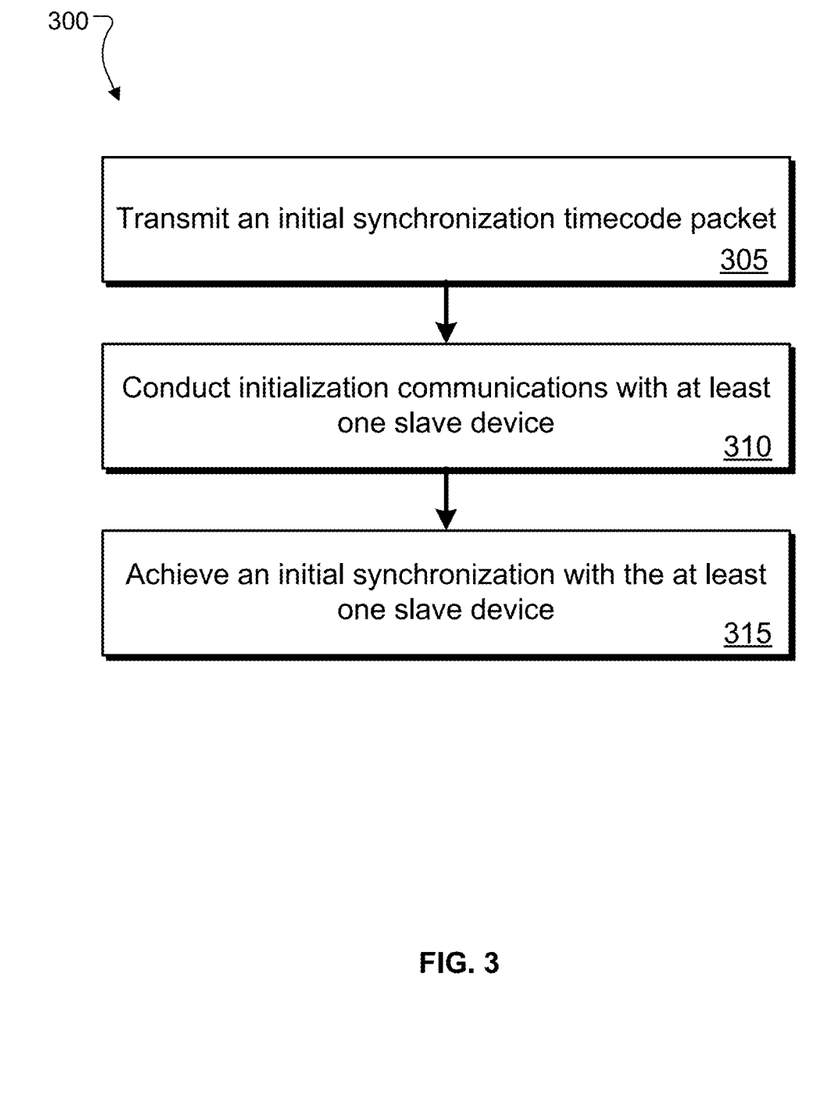
FIG. 3 is a flow chart diagramming an example process for achieving an initial synchronization with a media device.

FIG. 3 is a flow chart diagramming an example method 300 for achieving an initial synchronization with a media device. At 305, the method 300 includes transmitting by, for example, a base station (e.g., the master device 111 of FIG.

1) an initial synchronization timecode packet. This packet includes the synchronization schedule along with SMPTE time information. Once a media device (e.g., the slave device 100 of FIG. 1) receives the initial synchronization packet, the media device provides a response. The base station, at 310 of the method 300, conducts initialization communications with the media device. The devices are able to achieve an initial clock synchronization of a maximum 20 microsecond clock differential.

As stated herein, synchronizing media devices is beneficial to facilitate media post production processing. Additionally, ensuring that devices are synchronized over wireless networks requires precise timing due to inherent latency of wireless communications.

Figure 4:
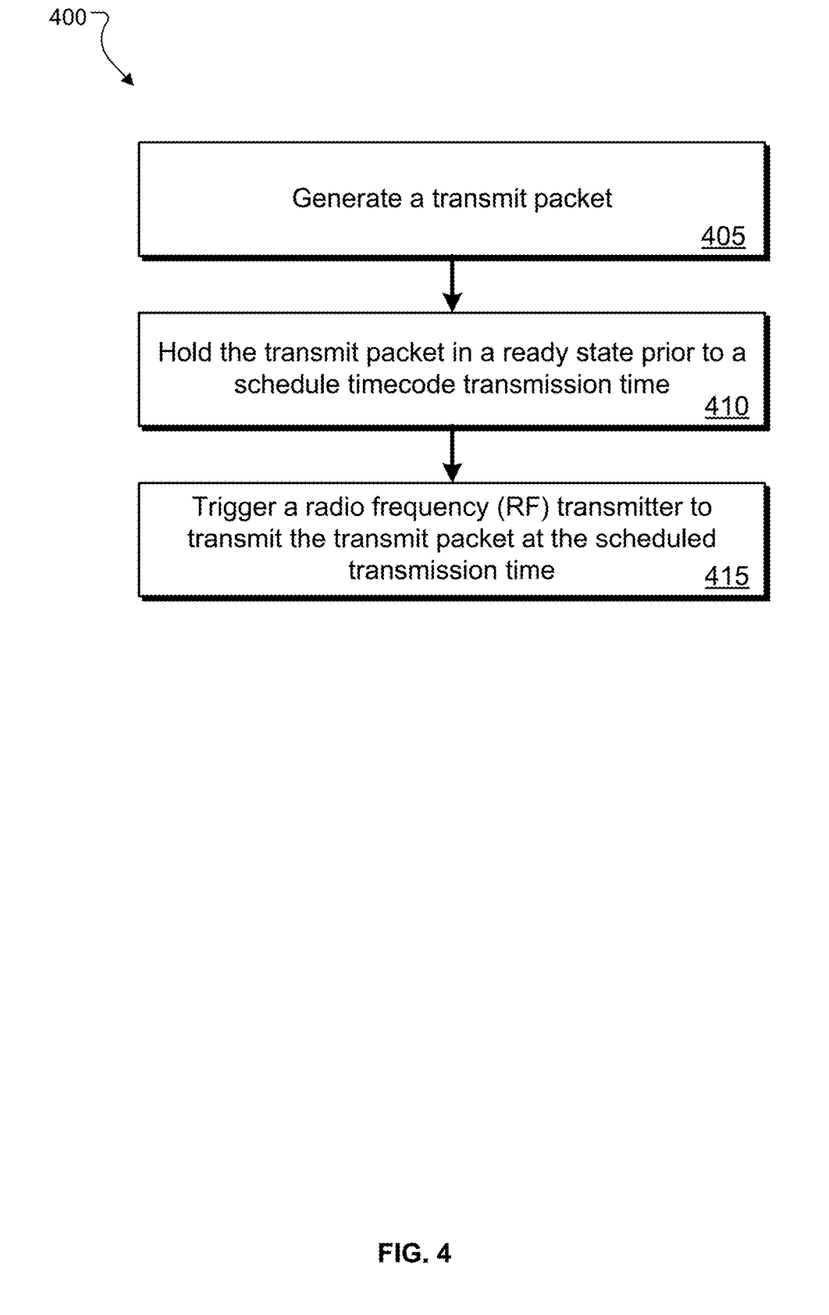
FIG. 4 is a flow chart diagramming an example process for transmitting a timecode packet at a precise time.

FIG. 4 is a flow chart diagramming a method 400 for transmitting a timecode packet at a precise time. The method 400, at 405, includes generating a transmit packet by, for example, the base station (e.g., the master device 111). The method 400 further includes, at 410, holding the transmit packet in a ready state prior to a scheduled transmission time. For example, the base station can generate a timecode packet via a timecode module (e.g., sync module 126 of FIG. 1). The base station can then hold the transmit packet in a memory (e.g., the memory 130 of FIG. 1). In response to a master clock (e.g., the clock 13 of FIG. 1) reaching a timecode transmission time, the method 400 includes triggering a radio frequency (RF) transmitter (e.g., the RF transceiver 124 of FIG. 1) to transmit the packet. In one example, the method 400 can use a gate array (e.g., the gate array 128), which is communicatively coupled to the clock, to trigger the RF transmitter to transmit the packet. In this manner, the packet is sent precisely at a scheduled transmission time. This process is advantageous over a software solution which can have processing latency issues.

Due to the inherent latency of wireless communications, media devices receiving timecode packets should also precisely determine timing information.

Figure 5:
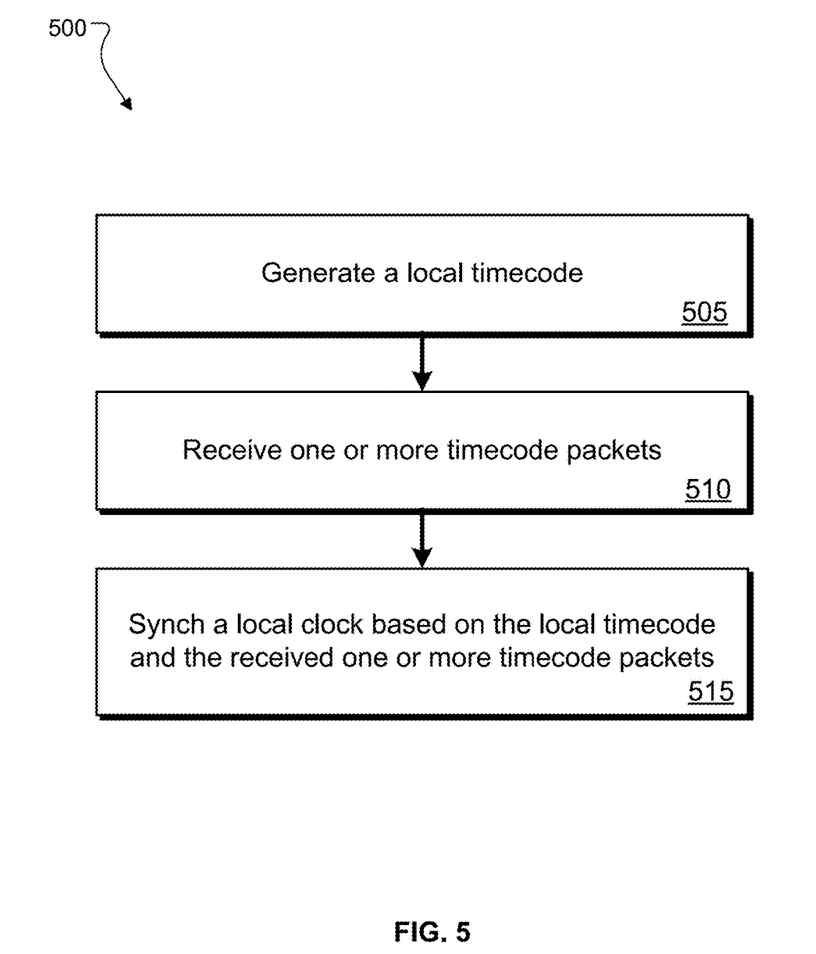
FIG. 5 is a flow chart diagramming an example process for synchronizing a local clock based on a local timecode and a received timecode.

FIG. 5 is a flow chart diagramming a method 500 for synchronizing a local clock based on a local timecode and a received timecode. The method 500, at 505, includes generating a local timecode at, for example, a media device (e.g., the slave device 100 of FIG. 1). The local timecode can have a time corresponding to a local clock (e.g., the clock 107 of FIG. 1). The media device, at 510 of the method 500, receives the timecode packets from, for example, a base station (e.g., the master device 111). At 515 of the method 500, the media device synchronizes its local clock based on a comparison of the local timecode and a timecode of the base station (i.e., the master device timecode, which is included in the received timecode packets).

Figure 6:
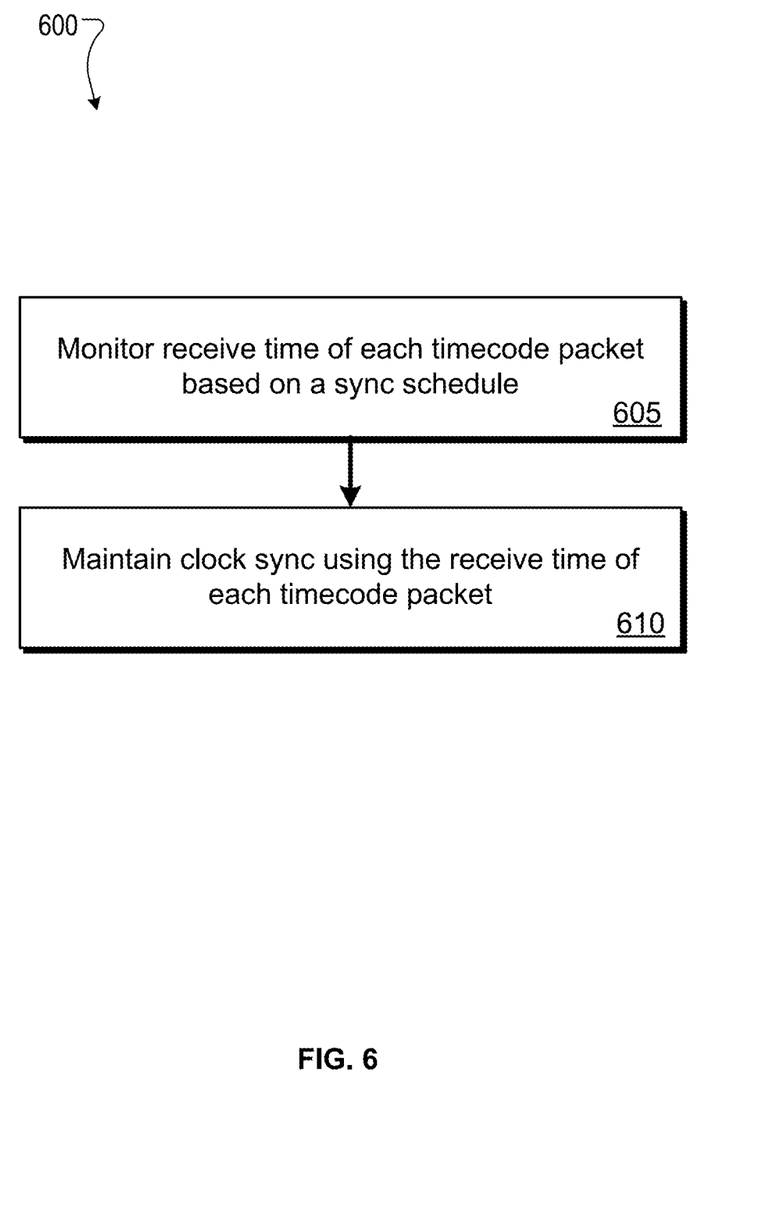
FIG. 6 is a flow chart diagramming an example process for maintaining synchronization between media devices.

FIG. 6 is a flow chart diagramming a method 600 for maintaining synchronization between media devices and determining a precise timing of timecode packet arrival. In particular, the method 600, at 605, includes monitoring by, for example, an RF receiver (e.g., the transceiver 108 of FIG. 1) receives a time of arrival of each timecode packet based on a synchronization schedule.

Figure 7:
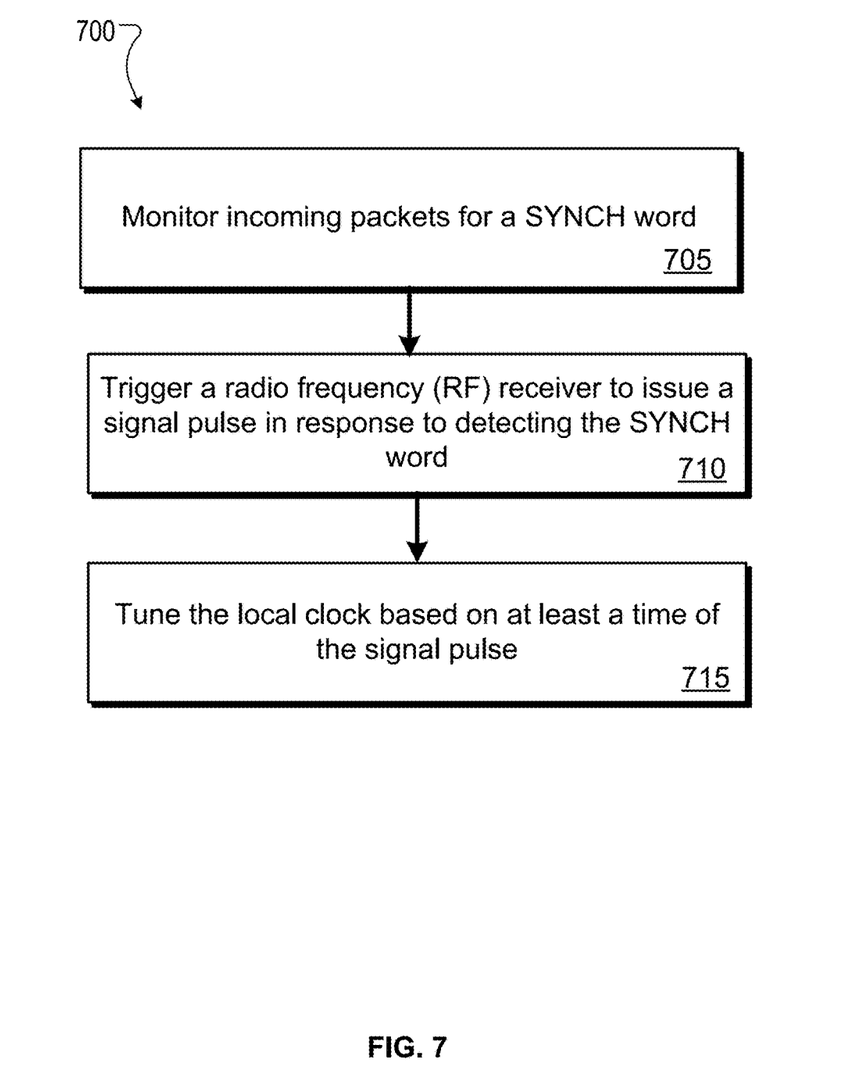
FIG. 7 is a flow chart diagramming an example process for precisely determining a time of arrival of a timecode packet for tuning a local clock.

For example, referring to the method 700 of FIG. 1, at 705, the RF receiver monitors incoming packets for a SYNCH word in a received packet. The SYNCH word acts as, for example, a flag to identify the packet as a timecode packet that is carrying timing information. In response to identifying the SYNCH word, the RF receiver issues a signal pulse to a gate array (e.g., the gate array 110 of FIG. 1). The gate array is communicatively coupled to a local clock (e.g., the clock 107) such that it can associate a time of the signal pulse with the arrival time of the received packet.

Referring back to FIG. 6, the method 600 includes maintaining clock synchronization of the local clock with respect to a master clock (e.g., the clock 13 of FIG. 1) based on the receive time of the one or more timecode packets and the synchronization schedule.

For example, referring again to the method 700 of FIG. 7, at 715, the gate array tunes the local clock using at least one of: the synchronization schedule, the arrival time of the received packet, and a transmission time embedded in the received packet.

Figure 8:
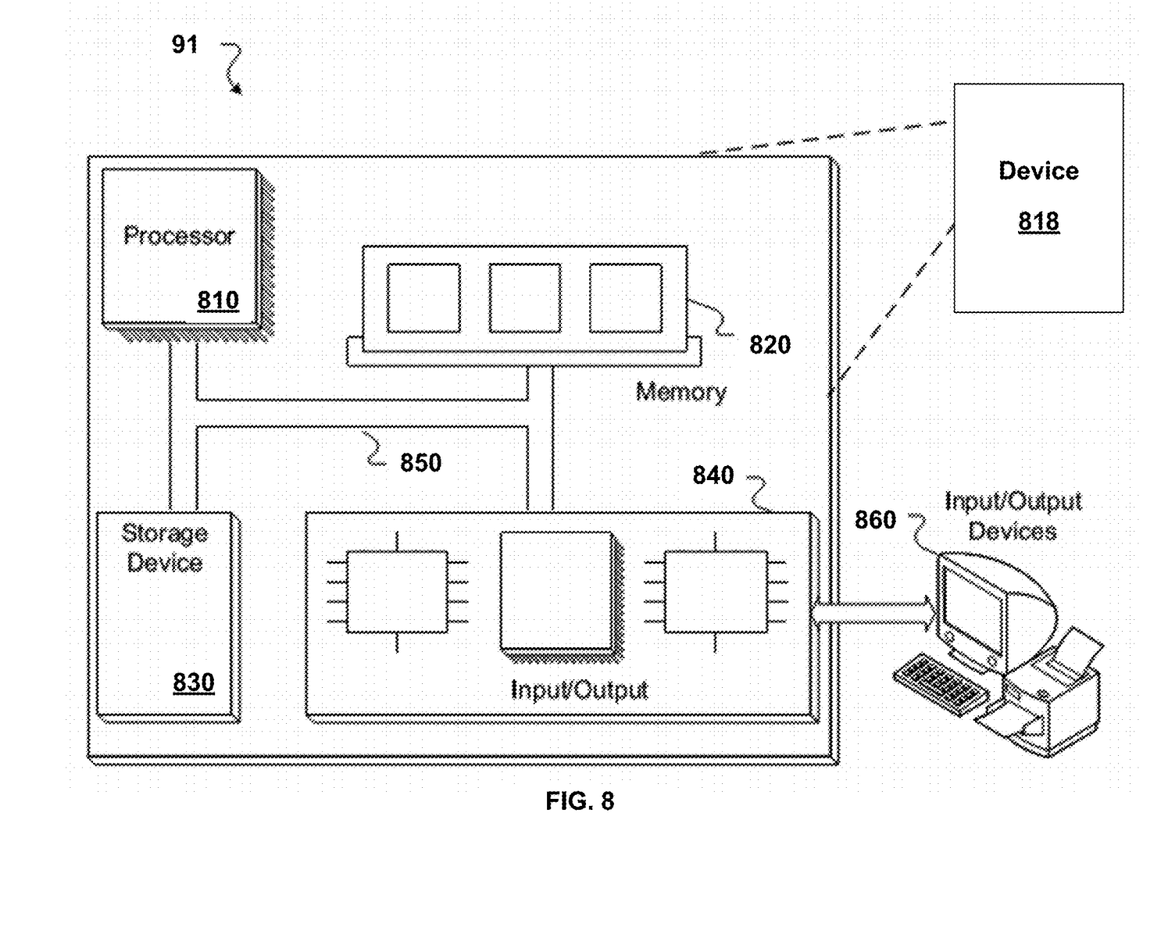
FIG. 8 illustrates a hardware configuration of the system shown in FIG. 1.

FIG. 8 is a block diagram of an exemplary computer system 91. For example, referring to FIG. 1, the system 10 can include the system 91. The system 800 includes a processor 810, a memory 820, a storage device 830, and an input/output device 840. Each of the components 810, 820, 830, and 840 can be interconnected, for example, using a system bus 850. The processor 810 is capable of processing instructions for execution within the system 91. In some implementations, the processor 810 is a single-threaded processor. In some implementations, the processor 810 is a multi-threaded processor. In some implementations, the processor 810 is a quantum computer. In some implementations, the processor 810 is a gate array (e.g., an FPGA). In some implementations, the processor 810 is an Application Specific Integrated Circuit (ASIC). The processor 810 is capable of processing instructions stored in the memory 820 or on the storage device 830. The memory subsystem 820 may contain instructions that when executed by the processor 810, cause the system to detect a base station, request timecode and/or genlock information, and synchronize with the received timecode and/or genlock information.

Using the described components, the system 91 is operable to synchronize with a timecode generator (e.g., device 818). The system may receive timecode and/or genlock information through the use of one or more input/output device, labeled "I/O" in FIG. 9.

The memory 820 stores information within the system 91. In some implementations, the memory 820 is a computer-readable medium. In some implementations, the memory 820 is a volatile memory unit. In some implementations, the memory 820 is a non-volatile memory unit.

The storage device 830 is capable of providing mass storage for the system 91. In some implementations, the storage device 830 is a computer-readable medium. In some implementations, the storage device 830 can include, for example, a hard disk device, an optical disk device, a solid-state drive, a flash drive, magnetic tape, or some other large capacity storage device. In some implementations, the storage device 830 may be a cloud storage device, e.g., a logical storage device including multiple physical storage devices distributed over a network and accessed using a network. The input/output device 940 provides input/output operations for the system 91. In some implementations, the input/output device 940 can include one or more of a network interface devices, e.g., an Ethernet card, a serial communication device, e.g., an RS-232 port, and/or a wireless interface device, e.g., an 802.9 card, a 3G wireless modem, a 4G wireless modem, or a carrier pigeon interface. In some implementations, the input/output device can include driver devices configured to receive input data and send output data to other input/output devices, e.g., keyboard, printer, and display devices 860. In some implementations, mobile computing devices, mobile communication devices, and other devices can be used.

Figure 9:
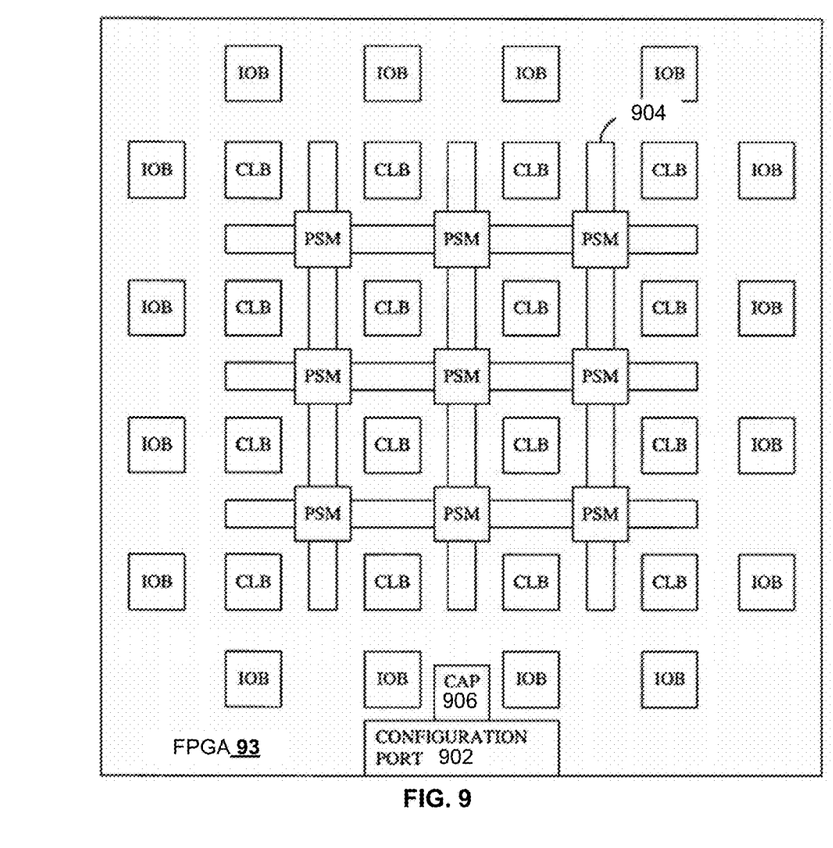
FIG. 9 is a simplified schematic of a conventional gate array (e.g., a field programmable gate array (FPGA)) for use with the system shown in FIG. 1.

FIG. 9 is a simplified schematic of a conventional FPGA 93. The FPGA 93 includes user logic circuits such as input/output blocks (IOBs), configurable logic blocks (CLBs), and a programmable interconnect 904, which contains programmable switch matrices (PSMs). The CLB can include logic blocks made of logic gates (e.g., NAND gates), an interconnection of multiplexors, a lookup table, and PAL style wide input gates, and other compatible logic blocks.

Each IOB and CLB can be configured through a configuration port 902 to perform a variety of functions. This configuration can be accomplished using a number of programming technologies compatible with reconfigurable architectures (e.g., static memory, flash, and anti-fuse based programming technologies.) A programmable interconnect 904 can be configured to provide electrical connections between the various CLBs and IOBs by configuring the PSMs and other programmable interconnection points (PIPS, not shown) through a configuration port 902. Typically, the IOBs can be configured to drive output signals or to receive input signals from various pins (not shown) of the FPGA 93.

The FPGA 93 also includes dedicated internal logic. Dedicated internal logic performs specific functions and can only be minimally configured by a user. For example, a configuration port 902 is one example of dedicated internal logic. Other examples may include dedicated clock nets (not shown), power distribution grids (not shown), and boundary scan logic (i.e. IEEE Boundary Scan Standard 1149.1, not shown).

The FPGA 93 is illustrated with 16 CLBs, 16 IOBs, and 9 PSMs for clarity only. Actual FPGAs may contain thousands of CLBs, thousands of IOBs, and thousands of PSMs. The ratio of the number of CLBs, IOBS, and PSMs can also vary.

While the timecode module (e.g., the timecode module 114 of FIG. 1) is generally shown as an internal component within a media device, other implementations are possible. For example, the timecode module can be removable from the media device. In other examples, the timecode module can be an external module electrically connected to a camera.

While the exemplary wireless protocols are described, other protocols that are compatible with a personal device (e.g., a smartphone) can be used. For example, an iPhone can include 802.11a/b/g/n/ac Wi-Fi; Bluetooth 4.0 wireless technology; Bluetooth 4.2 wireless technology; and NFC, and each of these protocols, alone and in any combination, is compatible with the disclosed methods, devices, and systems.

The term "system" may encompass all apparatus, devices, and machines for processing data, including by way of example a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

A computer program (also known as a program, software, firmware, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment or implementation in a Field Programmable Gate Array (FPGA) or compiled firmware embedded in an Application Specific Integrated Circuit (ASIC). A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Computer readable media suitable for storing computer program instructions and data include all forms of non-volatile or volatile memory, media and memory devices, including by way of example semiconductor memory devices, e.g., EPROM, EEPROM, and flash memory devices; magnetic disks, e.g., internal hard disks or removable disks or magnetic tapes; magneto-optical disks; CD-ROM and DVD-ROM disks; or any other type of non-transitory storage medium suitable for storing electronic instructions, and each coupled to a computer system bus. The processor and the memory can be supplemented by, or incorporated in, special purpose logic circuitry. The components of the system can be interconnected by any form or medium of digital data communication, e.g., a communication network. Examples of communication networks include a LAN and a WAN.

Processor refers to any device or system of devices that performs processing operations. A processor will generally include a chip, such as a single core or multi-core chip, to provide a central processing unit (CPU). A processor may be provided by a chip from Intel or AMD. A processor may be any suitable processor such as the microprocessor sold under the trademark XEON E7 by Intel (Santa Clara, Calif.) or the microprocessor sold under the trademark OPTERON 6200 by AMD (Sunnyvale, Calif.).

While this disclosure has been particularly shown and described with references to example embodiments thereof, it will be understood by those skilled in the art that various changes in form and details may be made therein without departing from the scope of the disclosure encompassed by the appended claims.

What is claimed is:

1. A method for synchronizing media devices, the method comprising:
   generating a synchronization schedule based on a frequency of generation of one or more timecode packets, each timecode packet of the one or more timecode packets including a timecode; and
   synchronizing one or more media devices using the synchronization schedule by transmitting synchronization information, wherein transmitting synchronization information includes:
      holding a transmit packet in a ready state prior to a scheduled timecode transmission time based on the synchronization schedule, the transmit packet carrying the synchronization information, and
      using a gate array (GA) in communication with a clock to trigger a radio frequency (RF) transmitter to transmit the transmit packet at the scheduled timecode transmission time.

2. The method of claim 1 further comprising:
   determining a generation time for each timecode packet of the one or more timecode packets; and
   determining the frequency of generation based on the generation time of a set of the one or more timecode packets.

3. The method of claim 1 wherein generating the synchronization schedule includes using a clock having an accuracy of at least about 1 parts per million (PPM).

4. The method of claim 1 wherein generating the synchronization schedule includes determining at least one subject frame per second in which the one or more timecode packets are to be transmitted to at least one slave media device.

5. The method of claim 4 wherein the at least one subject frame per second corresponds to the frequency of generation of each timecode packet.

6. The method of claim 1 further comprising performing an initial synchronization with at least one slave media device, the initial synchronization achieving a clock synchronization with the at least one slave device of least 20 microseconds.

7. The method of claim 1 further comprising:
generating a local timecode, the local timecode having a time corresponding to a local clock;
receiving the one or more timecode packets from a master device; and
synchronizing the local clock with a master device clock based on a comparison of the local timecode and a master device timecode, the master device timecode included in the one or more timecode packets.

8. The method of claim 7 further comprising:
monitoring receive time of each timecode packet of the one or more timecode packets based on the synchronization schedule; and
maintaining clock synchronization with the master device based on the receive time of the one or more timecode packets and the synchronization schedule.

9. The method of claim 8 further comprising:
monitoring incoming radio frequency (RF) packets to for a SYNCH word to identify a subject packet of the incoming RF packets as a timecode packet;
triggering an RF receiver to issue a signal pulse, the signal pulse used to measure an arrival time of the subject packet in response to detecting the SYNCH word; and
tuning the local clock using at least one of: the synchronization schedule, the arrival time of the time subject packet, and a transmission time embedded in the subject packet.

10. A system for synchronizing media devices, the system comprising:
a device comprising:
a synchronization module configured to:
generate a synchronization schedule based on a frequency of generation of one or more timecode packets, each timecode packet of the one or more timecode packets including a timecode, and
synchronize one or more media devices using the synchronization schedule;
a memory configured to hold a transmit packet in a ready state prior to a scheduled timecode transmission time based on the synchronization schedule, the transmit packet carrying synchronization information; and a gate array (GA), in communication with a clock, configured to trigger a radio frequency (RF) transmitter to transmit the transmit packet at the scheduled timecode transmission time.

11. The system of claim 10 wherein the synchronization module is further configured to:
determine a generation time for each timecode packet of the one or more timecode packets; and
determine the frequency of generation based on the generation time of a set of the one or more timecode packets.

12. The system of claim 10 further comprising a clock having an accuracy of at least about 1 parts per million (PPM).

13. The system of claim 10 wherein the synchronization module is further configured to generate the synchronization schedule by determining at least one subject frame per second in which the one or more timecode packets are to be transmitted to at least one slave media device.

14. The system of claim 13 wherein the at least one subject frame per second corresponds to the frequency of generation of each timecode packet.

15. The system of claim 10 wherein the synchronization module is further configured to perform an initial synchronization with at least one slave media device, the initial synchronization achieving a clock synchronization with the at least one slave device of least 20 microseconds.

16. The system of claim 10 wherein the one or more media devices further comprise:
a timecode module configured to generate a local timecode, the local timecode having a time corresponding to a local clock;
an RF receiver configured to receive one or more timecode packets from a master device; and
the timecode module configured to synchronize the local clock with a master device clock based on a comparison of the local timecode and a master device timecode, the master device timecode included in the one or more timecode packets.

17. The system of claim 16 wherein:
the RF receiver is further configured to:
monitor incoming radio frequency (RF) packets to for a SYNCH word to identify a subject packet of the incoming RF packets as a timecode packet,
issue a signal pulse to the GA, in communication with the local clock, in response to detecting the SYNCH word;
the GA is further configured to:
measure an arrival time of the subject packet in response to receiving the signal pulse, and
tune the local clock using at least one of: the synchronization schedule, the arrival time of the time subject packet, and a transmission time embedded in the subject packet.

* * * * *